United States Patent [19]

Miyata et al.

[11] Patent Number: 4,660,409
[45] Date of Patent: Apr. 28, 1987

[54] PIEZOELECTRIC PICK-UP DEVICE FOR INTERNAL COMBUSTION ENGINE

[75] Inventors: Hiroshi Miyata; Shogo Kawajiri, both of Aichi, Japan

[73] Assignee: NGK Spark Plug Co., Ltd., Japan

[21] Appl. No.: 682,788

[22] Filed: Dec. 18, 1984

[51] Int. Cl.[4] ............................................ G01L 23/22
[52] U.S. Cl. ........................................ 73/35; 310/346
[58] Field of Search ................. 73/35, 654, 651; 310/329, 346

[56] References Cited

U.S. PATENT DOCUMENTS

| | | | |
|---|---|---|---|
| 3,351,787 | 11/1967 | Kistler | 310/329 |
| 3,482,121 | 12/1969 | Hatschek | 310/346 |
| 4,359,658 | 11/1982 | Cartier | 310/329 |
| 4,485,325 | 11/1984 | Yamamoto et al. | 310/344 |
| 4,502,332 | 3/1985 | Sheridan et al. | 73/35 |

Primary Examiner—Stewart J. Levy
Assistant Examiner—Scott M. Oldham
Attorney, Agent, or Firm—Darby & Darby

[57] ABSTRACT

A piezoelectric pick-up device for an internal combustion engine is disclosed, which comprises a metal case mounted on an internal combustion engine cylinder wall or the like, a mounting metal rod projecting from the inner bottom surface of the metal case into the interior thereof, a piezoelectric element and a weight disposed in the case interior and fitted on the mounting rod, the piezoelectric element being electrically coupled to the metal case, a cap-like cover fittedly covering the weight or the entirety of the piezoelectric element and the weight, and a molding material filling the case interior. The cap-like cover is made of an elastic material or a hard material.

5 Claims, 5 Drawing Figures

PIEZOELECTRIC PICK-UP DEVICE FOR INTERNAL COMBUSTION ENGINE

BACKGROUND OF THE INVENTION

1. Field of the Invention

This invention relates to a piezoelectric pick-up device for an internal combustion engine, which is mounted on an internal combustion engine cylinder wall or the like for electrically detecting the knocking or the like generated in the internal combustion engine with a piezoelectric element.

2. Description of the Prior Art

A piezoelectric pick-up device of non-resonance type is well known in the art, in which a piezoelectric element and a weight thereon are disposed in and on the inner bottom surface of a metal case secured to an internal combustion engine cylinder wall or the like with the piezoelectric element electrically coupled to the metal case. When a knocking or like vibrations are generated, the piezoelectric element generates an output signal corresponding to a strain produced in the cylinder wall due to vibrations of the weight caused by gravitational acceleration thereof accompanying the knocking or the like. The knocking or the like is thus detected by the device.

In such a prior art piezoelectric pick-up device for an internal combustion engine, as shown in FIGS. 1 and 2, the interior space b of a case a, in which a piezoelectric element c and a weight d are disposed, is filled with a rubber-like molding material e, e.g., soft epoxy resins, to directly cover the piezoelectric element and the weight in order to suppress spurious vibrations and also provide an airtight enclosure. Changes in the elasticity of the rubber-like molding material with changing temperature, particularly hardening of the molding material due to a drop in temperature, would have serious adverse effects on the sensor characteristics.

In case of a sealed structure as shown in FIG. 2, where the open top of the interior space b is sealedly closed by a lid f, volume changes of the molding material e are not allowed. Therefore, an expansion force produced in the molding resin with a temperature rise would apply an excess load on the piezoelectric element c and the weight d to adversely affect the output of the pick-up device. In either structure of FIG. 1 or 2, the temperature characteristics have been inferior.

SUMMARY OF THE INVENTION

The present invention has been intended to overcome the above drawbacks in the prior art, and its object is to provide a piezoelectric pick-up device, which can alleviate or eliminate adverse effects of the hardening and thermal expansion and contraction of the molding material and has improved temperature characteristics.

According to the present invention, there is provided a piezoelectric pick-up device for an internal combustion engine, which comprises a metal case mounted on an internal combustion engine cylinder wall or the like, a mounting metal rod projecting from the inner bottom surface of the metal case into the interior thereof, a piezoelectric element and a weight disposed in the case interior and fitted on the mounting rod, the piezoelectric element being electrically coupled to the metal case, a cap-like cover fittedly covering the weight or the entirety of the piezoelegtric element and the weight, and a molding material filling the case interior. The cap-like cover is made of an elastic material or a hard material.

The above mentioned and other objects and features of the invention will become apparent from the following detailed description taken in conjunction with the drawings which indicate embodiments of the invention.

DETAILED DESCRIPTION OF THE PREFERRED EMBODIMENTS

Figure 3:
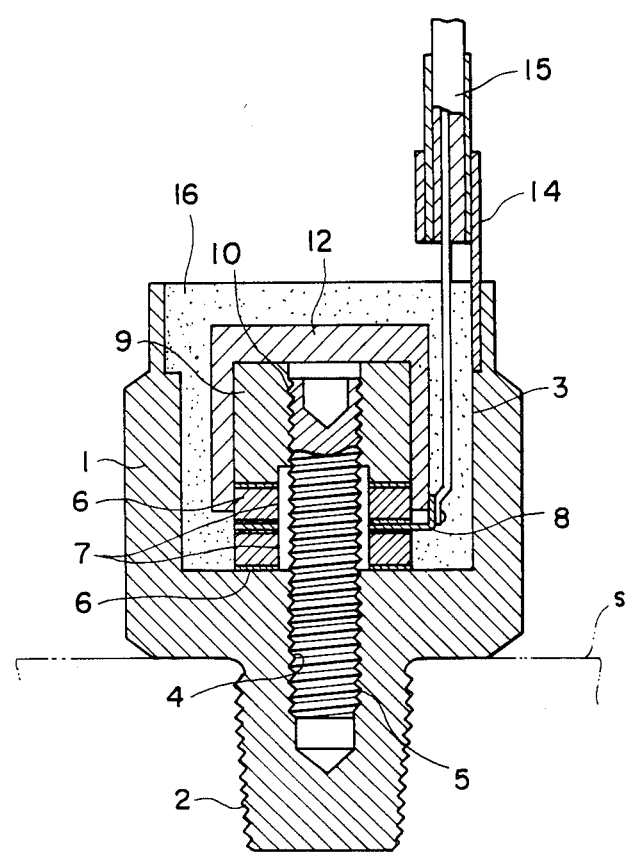
FIGS. 3 and 4 are longitudinal sectional views, to an enlarged scale, for explaining piezoelectric pick-up devices embodying the present invention.

Referring to FIG. 3, a metal case 1 is mounted in an internal combustion engine cylinder wall S or the like with its male threaded projection 2 projecting from the bottom screwed in the wall S. The case 1 has an interior space 3 open at the top, and it has a threaded hole 4 extending from its inner bottom surface. A lower portion of a threaded mounting rod 5 is screwed in the threaded hole 4 so that its remainder projects upright into the interior space 3.

Two annular piezoelectric elements 6, each of which has a central hole 7 and has electrodes provided on the top and bottom surfaces, are fitted together with an intervening electrode sheet 8 on the threaded mounting rod 5 and seated on the bottom of the interior space 3. An annular weight 9, which has the same outer diameter as the annular piezoelectric elements 6 and has a central hole with a female thread 10, is screwed on the threaded mounting rod 5 such that it is seated on the assembly of the piezoelectric elements 6.

A cylindrical elastic cap-like cover 12, which is an essential element of the present invention, covers the weight 9 or both of the piezoelectric elements 6 and the weight 9 thereon. The cap 12 has the same inner diameter as the outer diameter of the piezoelectric elements 6 and the weight 9, so as to snugly fit on these elements. It is made of such an elastic material as foamed rubber or foamed chloroprene rubber. It is fitted such that its lower end is located slightly above the electrode sheet 8 in order to permit electric connection thereof to a lead wire 15 which will be described herein-after in detail. Alternatively, the cap-like cover 12 may cover the entirety of the piezoelectric elements 6 and the weight 9 with a lead hole formed adjacent its lower end. In this case, substantially the entire periphery of the piezoelectric elements 6 is covered, so that it is possible to eliminate the adverse effects of the hardness change and thermal expansion and contraction of the molding material 16.

In the illustrated embodiment, the lead wire 15 noted above that is connected to the electrode sheet 8 is supported by a lead holder 14 which is fitted on the inner surface of an upper end portion of the case 1. After the lead wire 15 has been connected to the electrode sheet 8, the interior space 3 of the case 1 is filled with molding material 16 such as epoxy resin or silicone. In this state, the electrode provided on the top of the upper piezoelectric element 6 is grounded to the body of the case 1 via the weight 9 and the threaded mounting rod 5, while the electrode provided on the bottom of the lower piezoelectric element 6 is directly grounded to the case 1. An output voltage that is produced across the piezoelectric elements 6 is taken out via the electrode sheet 8 and lead wire 15.

Figure 4:
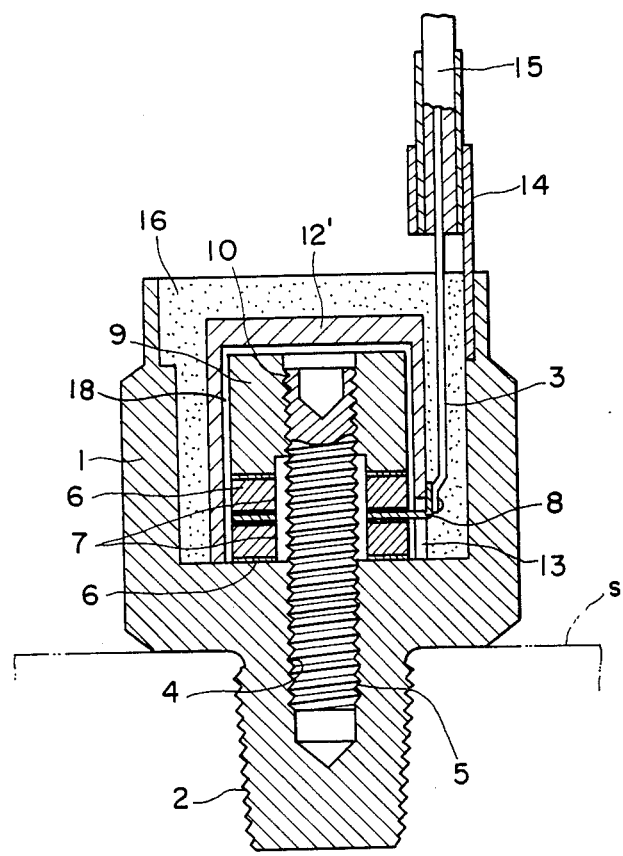

While the above embodiment has used the elastic cap, the same effects of the present invention may also be obtained by using a cap-like cover 12' made of a hard material such as a thermosetting resin or a metal as shown in FIG. 4. But the cap-like cover 12' made of a hard material must cover the entirety of the piezoelectric elements 6 and the weight 9. Because a cap-like cover 12' made of a hard material can not overcome the defects of the hardening of the molding material 16 and the thermal expansion thereof by covering only the weight 9. When a metal is used for the cap-like cover 12', an electrical insulation layer 18 must be formed on the inner surface thereof. A lead hole 13 is formed in the lowest end of the cap-like cover 12' in order to permit electric connection between the electrode sheet 8 and the lead wire 15. In this state, the cap-like cover 12' serves as a shield to shield the piezoelectric elements 6 and the weight 9 against the adverse effects of the hardening of the molding material 16 at low temperature and also the thermal expansion thereof at high temperature for protecting the piezoelectric element and the weight.

Figure 1:
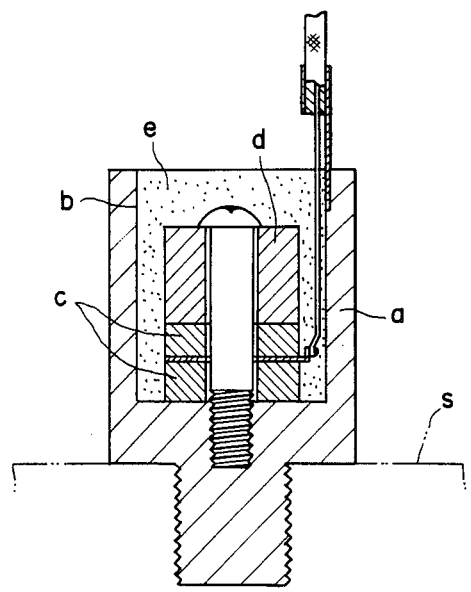
FIGS. 1 and 2 are longitudinal sectional side views showing respective prior art of piezoelectric pick-up devices.
Figure 2:
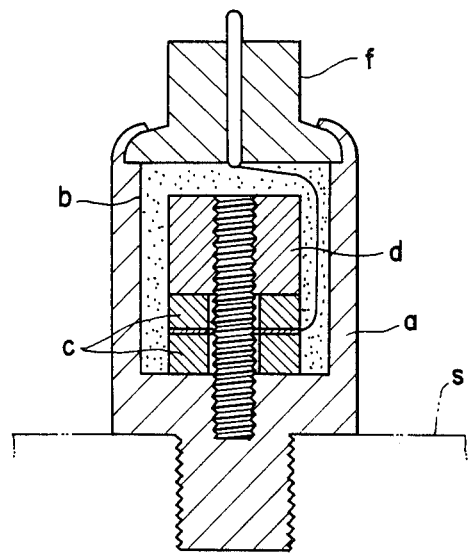
Figure 5:
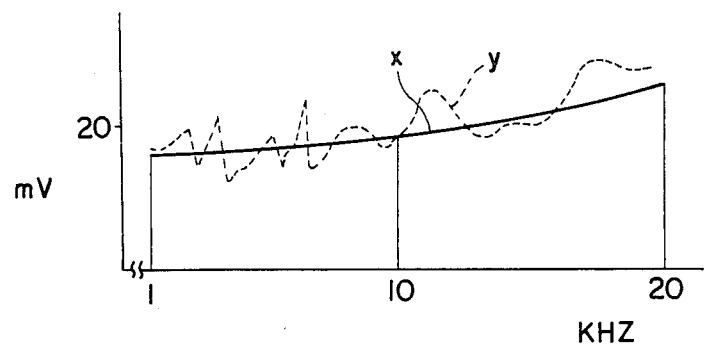
FIG. 5 is a diagram graphically showing voltage versus frequency characteristics of pick-up devices at low temperatures.

FIG. 5 is a graph showing the output voltage characteristics of the pick-up device according to the present invention having the structure shown in FIGS. 3 and 4 and of the prior art device having the structure shown in FIG. 1. These devices were each fabricated using two piezoelectric elements of zirconic lead titanate with a piezoelectric constant $g_{33} = 17.1 \times 10^{-3}$ Vm/N, an outer diameter of 10 millimeters aninner diameter of 5 millimeters and a thickness of 3 mm. The characteristic of the device according to the present invention is represented by curve x, while that of the prior art device is represented by curve y. In the diagram, the ordinate is taken for frequency, and the abscissa is taken for the output voltage obtained at a low temperature of $-40°$ C. The output voltage was measured by applying vibrations at a constant acceleration of 1 G (gravitational acceleration) to the device.

As is obvious from FIG. 5, with the prior art device the output voltage fluctuates considerably with the frequency. In contrast, with the device of the embodiment of the present invention the output voltage changes smoothly with increasing frequency. This means that according to the present invention the cap-like cover 12 or 12' has an effect of alleviating the adverse influence of the hardening of the molding material 16 at low temperature.

In addition, where the interior space 3 of the case 1 of the pick-up device according to the present invention is sealed with a lid, the output characteristic is not deteriorated at high temperatures. This means that the cap-like cover 12 or 12' absorbs the thermal expansion of the molding material 16 due to a temperature rise and thus prevents adverse effects on the piezoelectric elements 6 and the weight 9.

As has been described in the foregoing, with the piezoelectric pick-up device according to the present invention the adverse effects of the hardness change and thermal expansion and contraction of the molding material 16 filling the interior space 3 of the metal case 1 on the piezoelectric elements 6 and the weight 9 disposed in the case interior 3, is alleviated or eliminated by the cap-like cover made of either an elastic material or a hard material, which covers the weight or the entirety of the piezoelectric elements and the weight, thus greatly improving the output characteristics of the piezoelectric elements 6.

What is claimed is:

1. A piezoelectric pick-up device for an internal combustion engine comprising:
   a metal housing having a threaded bottom projection;
   threaded metal mounting rod means projecting from the inner bottom surface of said metal housing into the interior thereof;
   a piezoelectric element disposed in said housing interior and fitted on said mounting rod means, said piezoelectric element being electrically coupled to said metal housing;
   weight means disposed in said housing interior and threaded on said mounting rod means over said piezoelectric element;
   cap-like cover means fittedly covering said weight means; and
   molding material disposed within the housing interior, between the walls of said housing interior and said cover means, whereby said cover means isolates said piezoelectric element and threaded weight means from the effects of distortion of said molding material.

2. The piezoelectric pick-up device according to claim 1, wherein said cap-like cover means also fittedly covers said piezoelectric element.

3. The piezoelectric pick-up device according to claim 1, wherein said cap-like cover means is made of an elastic material.

4. The piezoelectric pick-up device according to claim 2, wherein said cap-like cover means is made of a hard material.

5. The piezoelectric pick-up device according to claim 2, wherein said cap-like cover means is made of an elastic material.

* * * * *